US009269493B2

(12) United States Patent
Grosrenaud et al.

(10) Patent No.: US 9,269,493 B2
(45) Date of Patent: *Feb. 23, 2016

(54) PLASTIC FILM HAVING A HIGH VOLTAGE BREAKDOWN

(71) Applicant: DuPont Teijin Films U.S. Limited Partnership, Chester, VA (US)

(72) Inventors: Alexis Grosrenaud, Hautcharage (LU); Lucien Schosseler, Luxembourg (LU)

(73) Assignee: DUPONT TEIJIN FILMS U.S. LIMITED PARTNERSHIP, Chester, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/324,641

(22) Filed: Jul. 7, 2014

(65) Prior Publication Data

US 2014/0322513 A1    Oct. 30, 2014

Related U.S. Application Data

(63) Continuation of application No. 12/937,143, filed on May 19, 2011, now Pat. No. 8,804,308.

(30) Foreign Application Priority Data

Apr. 11, 2008 (EP) .................................. 08290360

(51) Int. Cl.
| C08J 5/18 | (2006.01) |
| H01G 4/14 | (2006.01) |
| C08L 67/02 | (2006.01) |
| C08L 69/00 | (2006.01) |
| H01G 4/18 | (2006.01) |
| H01B 3/42 | (2006.01) |

(52) U.S. Cl.
CPC ... *H01G 4/14* (2013.01); *C08J 5/18* (2013.01); *C08L 67/02* (2013.01); *C08L 69/00* (2013.01); *H01B 3/423* (2013.01); *H01B 3/426* (2013.01); *H01G 4/18* (2013.01); *C08J 2367/02* (2013.01); *C08J 2369/00* (2013.01); *Y02T 10/7022* (2013.01); *Y10T 29/435* (2015.01)

(58) Field of Classification Search
None
See application file for complete search history.

(56) References Cited

U.S. PATENT DOCUMENTS 3,720,732 A * 3/1973 Sevenich ..................... 525/439
3,956,229 A   5/1976 Bollen et al.
(Continued)

FOREIGN PATENT DOCUMENTS

EP    0 039 214 A1    11/1981
EP    0 644 226 A1    3/1995
(Continued)

OTHER PUBLICATIONS

Bendler, Macromolecules, 2013, 46, 4024-4033.*
(Continued)

*Primary Examiner* — Robert C Boyle
(74) *Attorney, Agent, or Firm* — RATNERPRESTIA

(57) ABSTRACT

A stretched film includes a dispersion of at least one polyester and/or polycarbonate in a matrix of at least one polyester and/or polycarbonate different from the first polyester and/or polycarbonate, the percentage by weight of the dispersed polyester and/or polycarbonate in the dispersion being less than 50% and the dispersed polyester and/or polycarbonate being in the form of platelets. The stretched film can be used as a dielectric in a capacitor.

30 Claims, 5 Drawing Sheets

(56) References Cited

U.S. PATENT DOCUMENTS

| | | | |
|---|---|---|---|
| 4,435,475 A | 3/1984 | Sasaki et al. | |
| 4,756,953 A | 7/1988 | Utsumi | |
| 6,084,019 A | 7/2000 | Matyabas et al. | |
| 6,426,861 B1 | 7/2002 | Munshi | |
| 2005/0020803 A1 | 1/2005 | Machida et al. | |
| 2006/0226562 A1 | 10/2006 | Johnson et al. | |
| 2006/0270806 A1 | 11/2006 | Hale | |
| 2010/0193218 A1* | 8/2010 | Sugo et al. | 174/126.1 |

FOREIGN PATENT DOCUMENTS

| | | | |
|---|---|---|---|
| EP | 1 712 592 A1 | | 10/2006 |
| JP | 06-220220 | | 8/1994 |
| JP | 2001-329077 A | | 11/2001 |
| JP | 2004-107471 | * | 4/2004 |
| JP | 2004-107471 A | | 4/2004 |
| JP | 2004-131728 | | 4/2004 |
| JP | 2004-285145 A | | 10/2004 |
| JP | 2006-062681 A | | 3/2006 |
| JP | 2014-062261 A | | 4/2014 |
| WO | WO 2006/107970 | | 10/2006 |
| WO | WO 2007/029742 | * | 3/2007 |
| WO | WO 2009/125288 | | 10/2009 |

OTHER PUBLICATIONS

Computer Translation of JP 2004-107471 (2004).*

Feldmann, Gabriele, International Search Report dated Nov. 24, 2009, 3 pgs.

"Purasuchikku Seikei Kakou Detabukku," Nikkan Kougyou Shinbunsha, Jan. 28, 2002, pp. 24-27.

"Purasuchikku Seikei Kakou Detabukku," Nikkan Kougyou Shinbunsha, Jan. 28, 2002, pp. 2-3.

"Properties of Various High Performance Films," Teijin DuPont Films Japan Limited, Oct. 30, 2014, downloaded Nov. 11, 2014.

"DSC Sokutei Detashu," Kabushiki Kaisha Rigaku, Jan. 30, 2014, pp. 1-19.

"Netsu Bujnseki Jirei (DSC)," Kabushiki Kaisha Daidou Bunseki Risachi, Oct. 30, 2014.

"Bunseki No Genri, 16 Shisa Siusa Netsuryoukei (DSC) No Genri to Ouyou," Ippan Shadan Houjin Nihon Bunseki Kiki Kougyoukai, Oct. 30, 2014, pp. 1-5.

Japanese Office Action for Application No. 2013-233767 mailed Nov. 11, 2014.

Japanese Office Action for Application No. 2013-233768 mailed Nov. 11, 2014.

U.S. Office Action for U.S. Appl. No. 14/688,402 mailed Nov. 16, 2015.

* cited by examiner

PLASTIC FILM HAVING A HIGH VOLTAGE BREAKDOWN

This application is a Continuation of U.S. patent application Ser. No. 12/937,143, filed 19 May 2011, which is the National Phase filing of PCT Application No. IB2009/005217, filed 10 Apr. 2009, which claims priority of European Application No. EP 08290360.0, filed 11 Apr. 2008, the entireties of which applications are incorporated herein by reference.

FIELD OF THE INVENTION

The present invention relates to a plastic film which can be used as a dielectric film in capacitors. The invention also relates to the process of manufacturing such plastic film.

BACKGROUND OF THE INVENTION

A capacitor generally consists of two conducting metal plates separated by an insulating media (dielectric film) capable of storing electrical energy. The capacitor is formed by sandwiching the dielectric film between the two conducting metal plates. The film serves as an insulant which prevents the electrons from moving from one capacitor plate to the opposite plate. The maximum energy that can be safely stored in a particular capacitor is limited by the maximum electric field that the dielectric can withstand before it breaks.

The energy which can be stored by the film is proportional to the dielectric constant of the film and to the electrical breakdown of the dielectric as shown by the following equation.

$$\text{Energy density } E = 0.5 \cdot \in \cdot \in_0 \cdot BDV^2,$$

where BDV is the breakdown voltage (in V/μm),
$\in$ is the theoretical relative permittivity of the film, also named dielectric constant,
$\in_0$ is the absolute permittivity.

The energy density of a capacitor containing a plastic film can be increased by increase of the relative permittivity. This is obtained by use of a polar polymeric material or by addition of a polar component such as polar polymers or additives such as ceramic particles in the polymeric film.

Capacitors in which a plastic film is used as the dielectric film with high relative permittivity are known in the art. For example, EP-A-0 039 214 describes capacitors in which the dielectric film comprises a vinylidene fluoride polymer, polycarbonate and/or a thermoplastic polyester.

U.S. Pat. No. 6,426,861 describes a plastic film having a high energy density. This film is made of a homogeneous mixture comprising at least one non-polar homopolymer and at least one polar or non-polar homopolymer. Examples of non-polar homopolymers are: polypropylene (PP), polyethylene naphthalate (PEN), polycarbonate (PC) and polyphenylene sulphide (PPS). An example of a polar polymer is polyvinylidene fluoride (PVDF). The homopolymers are blended and co-extruded with homogenization to form a melt-cast hybrid copolymer dielectric film. This document describes polymeric hybrid copolymers of PVDF and PP. It also describes a copolymer comprising PVDF and PP as one component and either PPS or PC or PET or PEN as a second component. The film disclosed in U.S. Pat. No. 6,426,861 is prepared from homogeneous solid-solution mixtures.

The energy density of a capacitor containing a plastic film can be increased by increase of the breakdown voltage of the plastic film.

EP-A-1 712 592 discloses a biaxially oriented film suitable as a film capacitor. This biaxially oriented film comprises a aromatic polyester (a) and a polyolefin (b) having a melting point of from 230 to 280° C., wherein the ratio of the polyolefin (b) is from 2 to 60% based on the entire weight of the film. The polyolefin is preferably a styrene polymer having a syndiotactic structure. It is preferred that the film does not have voids. The voids formed at the boundary between the aromatic polyester (a) forming the matrix phase and the polyolefin (b) forming the island phase. In case where voids are present, the film tends to be cut in the film stretching step. Further, as the film thickness is reduced, the portions of the voids result in defects which deteriorate the mechanical characteristic or deteriorate the withstand voltage characteristic. The voids can be eliminated by using a compatibilizing agent.

The present invention is directed to a plastic film having a high breakdown voltage. This film can be used as a dielectric film in a capacitor. It imparts a high energy density to the capacitor.

The present invention is also directed to a process for increasing the breakdown voltage of a plastic film by modification of the plastic film morphology.

SUMMARY OF THE INVENTION

The invention is directed to a stretched film comprising a dispersion of at least one polyester and/or polycarbonate in a matrix of at least one polyester and/or polycarbonate different from the first polyester and/or polycarbonate, the percentage by weight of the dispersed polyester and/or polycarbonate in the dispersion being less than 50% and the dispersed polyester and/or polycarbonate being in the form of platelets.

In one embodiment, the stretched film has a thickness in the range of 0.3 to 25 μm, preferably in the range of 0.9 to 6 μm, more preferably in the range of 2 to 4 μm.

In one embodiment, the largest dimension of said platelets is less than 10 microns, preferably less than 5 microns, more preferably less than 1 micron.

The invention is also directed to a stretched film comprising a mixture comprising:
at least 50% by weight of a matrix of at least one polyester and/or polycarbonate,
at least one polyester and/or polycarbonate miscible and compatible with the at least one polyester and/or polycarbonate constituting the matrix and forming a separate phase in the matrix, the mixture being devoid of compatibilizer.

In one embodiment, in the said matrix of at least one polyester and/or polycarbonate, the polyester is selected from the group comprising polyethylene terephthalate (PET), polyethylene naphthalate (PEN), polyethylene isophthalate, polybutylene terephthalate (PBT), polybutylene isophthalate, polybutylene naphthalate, polytrimethylene terephthalate (PTT), polytrimethylene isophthalate, polytrimethylene naphthalate, poly(cyclohexylene-dimethanol-terephthalate (PCT), polymethylene 1,3-propylene terephthalate, polyhexamethylene terephthalate, polyisosorbide terephthalate (PEIT), polyhexamethylene naphthalate, polyarylates (Par), copolymers thereof, mixtures thereof and liquid crystalline polyesters.

In one embodiment, in the said matrix of at least one polyester and/or polycarbonate, the polycarbonate is selected from the group comprising polypropylene carbonate (PPC), polyphthalate carbonate, diphenyl polycarbonate (DPC), polyethylene terephthalate carbonate, polyethylene carbonate, copolymers thereof and mixtures thereof.

In one embodiment, the at least one dispersed polyester or the at least one miscible and compatible polyester is selected from the group comprising, polyethylene terephthalate (PET), polyethylene naphthalate (PEN), polyethylene isophthalate, polybutylene terephthalate (PBT), polybutylene isophthalate, polybutylene naphthalate, polytrimethylene terephthalate (PTT), polytrimethylene isophthalate, polytrimethylene naphthalate, poly(cyclohexylene-dimethanol-terephthalate (PCT), polymethylene 1,3-propylene terephthalate, polyhexamethylene terephthalate, polyisosorbide terephthalate (PEIT), polyhexamethylene naphthalate, polyarylates (Par), copolymers thereof, mixtures thereof, and liquid crystalline polyesters.

In one embodiment, the at least one dispersed polycarbonate or the at least one miscible and compatible polycarbonate is selected from the group comprising polypropylene carbonate (PPC), polyphthalate carbonate, diphenyl polycarbonate (DPC), polyethylene terephthalate carbonate, polyethylene carbonate, copolymers thereof and mixtures thereof.

In one embodiment, the at least one dispersed polyester and/or polycarbonate or the at least one miscible and compatible polyester and/or polycarbonate is selected from polymers having a relative permittivity in the range from 1 to less than 6, preferably from 1 to 4, preferably from 2 to 4, more preferably from 2.5 to 3.5.

In one embodiment, the stretched film is bi-axially stretched.

In one embodiment, the stretched film has an electrical breakdown, measured by the mean of 5×5 cm area, greater than 370 V/μm, preferably in the range of 440 to 550 V/μm.

In one embodiment, the stretched film has an energy density higher than 2.0 J/cm$^3$, preferably in the range of 2.5 to 3.5 J/cm$^3$ and more preferably in the range of 3.5 to 4.5 J/cm$^3$.

In one embodiment, the stretched film contains up to 60000 parts per million of filler particles.

In one embodiment, the stretched film is devoid of any filler.

In one embodiment, the stretched film has a mechanical modulus in machine direction (MD) or transverse direction (TD) higher than 1000 N/mm$^2$, preferably in the range of 2500 to 4000 N/mm$^2$.

In one embodiment, the stretched film has a shrinkage in both machine direction (MD) and transverse direction (TD) of less than 5% at a temperature of 150° C. and less than 15% at a temperature of 200° C.

In one embodiment, the dispersion consists of at least two polymers selected from the group consisting of polyesters and polycarbonates; the dispersion forming platelets each of which being formed by the at least two polymers and the matrix consists of a polyester selected from the group consisting of polyethylene terephthalate (PET) and polyethylene naphthalate (PEN); wherein the glass transition temperature of each of the polymers in the dispersion is in the range of Tgm+10° C. to Tgm+40° C., wherein Tgm is the glass transition temperature of the polyester of the matrix. In one embodiment, the dispersion is a mixture of a polycarbonate and a polyester and the polyester of the matrix is polyethylene terephthalate (PET). The polyester of the dispersion is polyethylene terephthalate (PET) or polybutylene terephthalate (PBT).

In one embodiment, the dispersion or the separate phase consists of a polycyclohexane-dimethanol-terephthalate (PCT) copolymer and the polyester of the matrix is polyethylene terephthalate (PET).

The films produced in these last two embodiments can be used as an electrical insulator film in power capacitors operating at voltages superior to 200 V and in a temperature range superior to 120° C.

In one embodiment, the dispersion or the separate phase consists of a polycarbonate (PC) and the polyester of the matrix is polyethylene naphthalate (PEN).

The invention is also directed to a capacitor comprising a dielectric film which is the stretched film as described above.

The invention is also directed to the use of the stretched as a barrier to oxygen.

The invention is also directed to the use of the stretched film as an electrical insulator film.

The invention is also directed to a process for making a stretched film, comprising the steps of:
a) providing a mixture of miscible and compatible polyesters and/or polycarbonates, the percentage by weight of at least one polymer in the mixture being at least 50%,
b) forming a film such that the at least one dispersed polymer is in the form of nodules,
c) stretching the film such that the at least one dispersed polymer is in the form of platelets,
d) heat treating the film.

In one embodiment, the film is bi-axially stretched.

In one embodiment, the film is simultaneously stretched.

In one embodiment, the stretching ratio is 2 to 7×, preferably 3.5 to 4.5×.

In one embodiment, step c) is carried out at a temperature in the range of Tg+5° C. to Tg+30° C. where Tg is the highest glass transition temperature of the polymers in the mixture.

In one embodiment, step d) is carried out at a temperature in the range of Tm−80° C. to Tm−10° C., preferably in the range of Tm−70° C. to Tm−20° C., where Tm is the highest melting temperature of the polymers in the mixture.

In one embodiment, the melt viscosities of the polyesters composing the mixture are in the range of 50 Pa·sec to 5000 Pa·sec at a temperature Tm where Tm is the highest melting temperature of the polymers in the mixture.

The invention is also directed to the use of a stretched film comprising a dispersion of at least one polymer in a matrix of at least one different polymer, for increasing the breakdown voltage of a capacitor film, the percentage by weight of the dispersed polymer in the dispersion being less than 50%, the dispersed polymer being in the form of platelets and having a relative permittivity less than 6.

In one embodiment, the absolute value of the difference between the relative permittivity of each polymer composing the dispersed phase and the mean relative permittivity of the matrix phase is less than 2, preferably less than 1. The relative permittivity of a matrix phase comprising two or more polymers can be determined by the following formula. This formula defines a "mean" relative permittivity of the matrix phase $\in_m$:

$$1/\in_m = \Sigma_i w_i / \in_{mi}$$

where $\in_m$ is the "mean" relative permittivity of the matrix phase,
$w_i$ is the weight percentage of the $i^{th}$ polymer in the matrix phase
$\in_{mi}$ is the relative permittivity of the $i^{th}$ polymer in the matrix phase

DETAILED DESCRIPTION OF THE INVENTION

The present invention relates to a stretched film obtained from a polymer mixture which is a dispersion of at least one polymer in a matrix of at least one different polymer. In the most preferred embodiment of the invention, the polymer mixture is a dispersion of at least one first polyester and/or polycarbonate in a matrix of at least one second polyester and/or polycarbonate different from the first polyester and/or polycarbonate. However, the person of ordinary skill in the art will readily recognize how to apply the invention to combinations of polymers other than polyesters and polycarbonates.

The polymer mixture is processed into a primary film which is then subjected to stretching. The resulting film is characterized by a high break-down voltage, a high energy density and a high service temperature.

The at least one dispersed polymer forms a first phase distinct from the matrix which forms a second phase. The at least one dispersed polymer forms nodules (or islands) in the polymer matrix. In the present invention, the term nodule denotes a body having a substantially round shape and which is characterized by a specific dimension ratio. This dimension ratio is the ratio of the nodule largest dimension to the nodule smallest dimension. It is less than 2, preferably less than 1.5. The smallest and the largest dimensions of the nodules are determined through electronic microscopy, by first cutting the primary film across its section, not across its plane, and then analyzing the picture of the resulting section.

Figure 1:
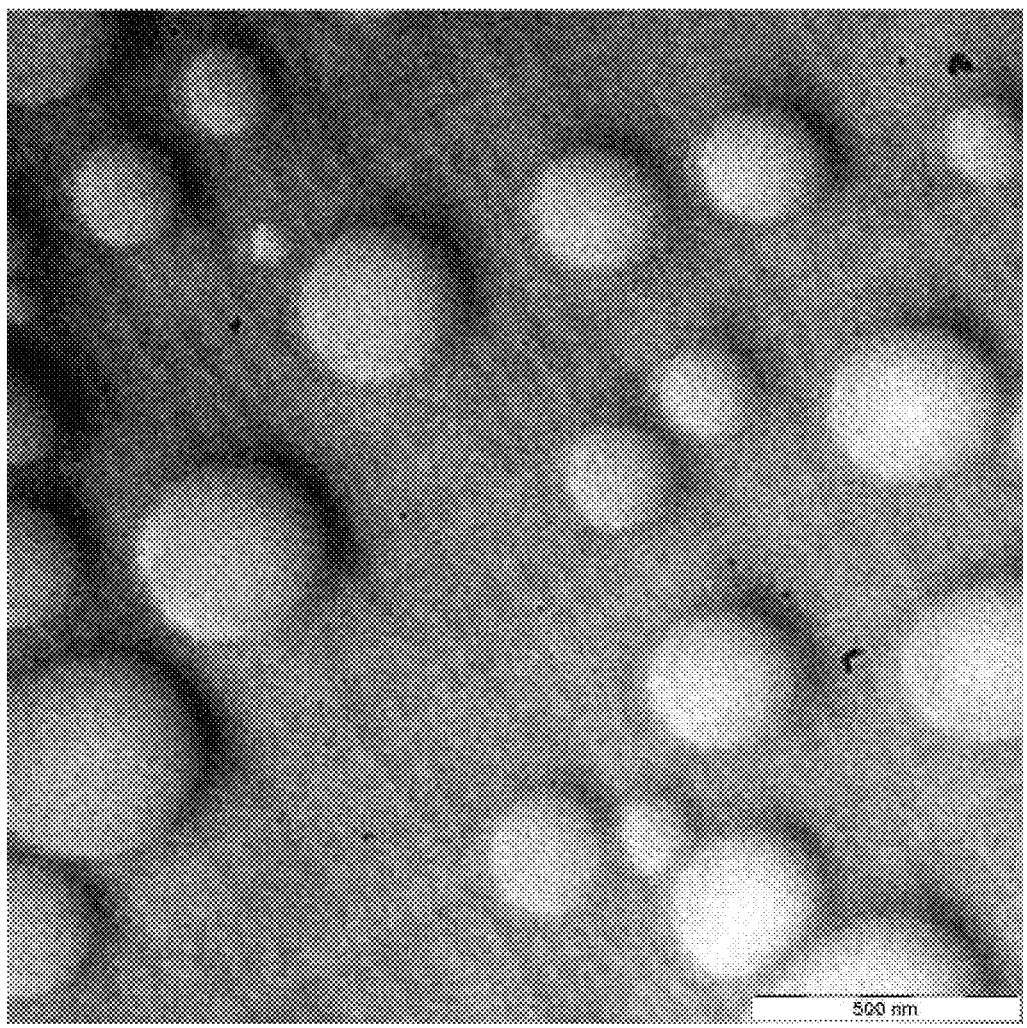
FIG. 1 represents an electron microscopy photography of an unstretched mixture comprising 30% of polycarbonate PC as a dispersed phase in a polyethylene naphthalate PEN matrix. The magnification rate is 10000.
Figure 2:
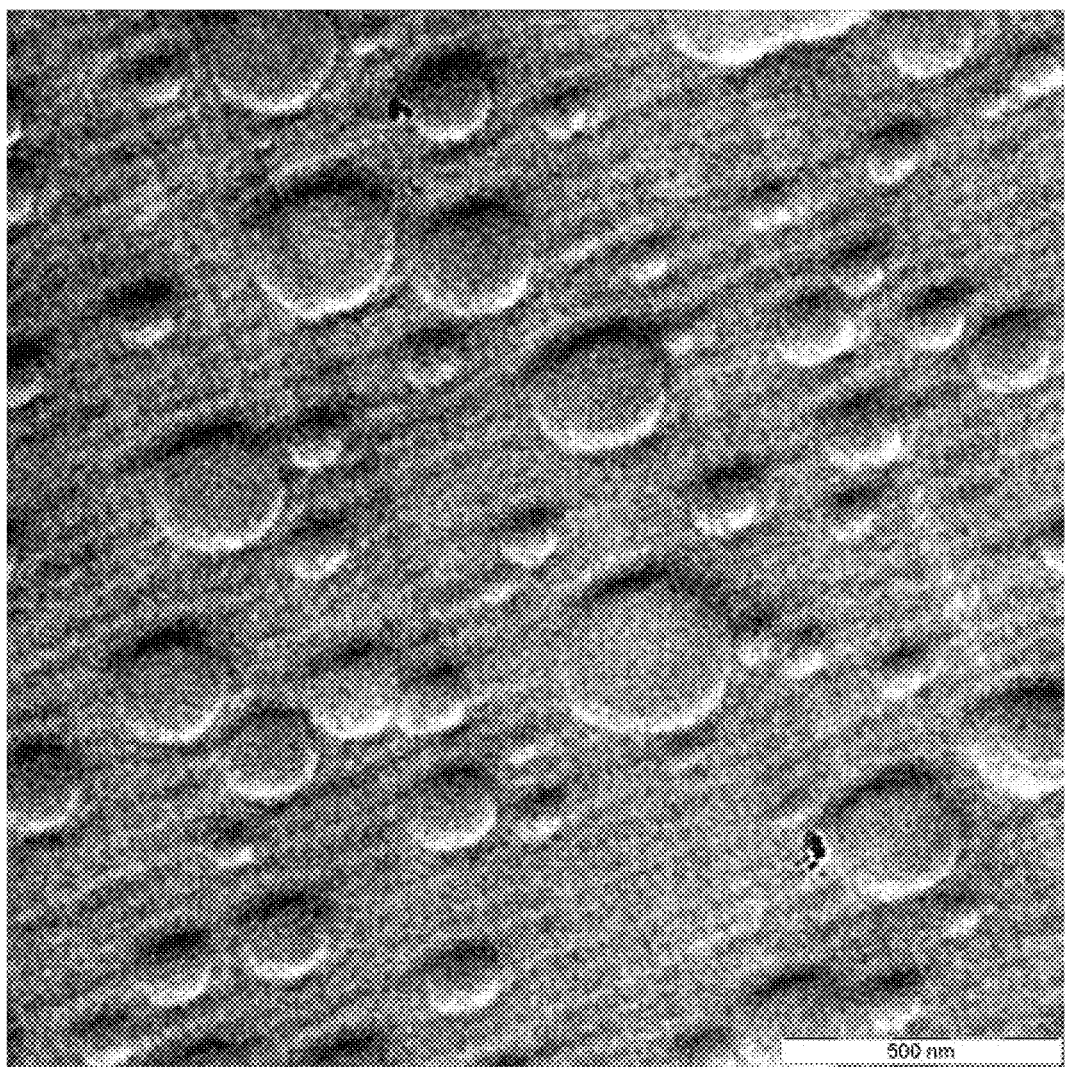
FIG. 2 represents an electron microscopy photography of an unstretched mixture comprising 20% polycarbonate PC as a dispersed phase in a matrix composed of PEN and PET. The magnification rate is 10000.

Electron microscopy can be used to show the phase separation and the presence of nodules. FIG. 1 represents an electron microscopy photography of a mixture comprising polycarbonate PC as a dispersed phase in a polyethylene naphthalate) PEN matrix. FIG. 2 represents an electron microscopy photography of an unstretched mixture comprising 20% polycarbonate PC as a dispersed phase in a matrix composed of PEN and PET. The nodules are visible in the photography as rounded masses of irregular shape. Their diameter is typically from 20 nm to 1000 nm.

The percentage by weight of the at least one dispersed polymer in the mixture is less than 50% of the mixture weight.

The percentage by weight of the at least one dispersed polymer in the mixture is preferably at least 5% of the mixture weight, more preferably at least 10% of the mixture weight, and even more preferably at least 25% of the mixture weight.

In one preferred embodiment, the phase separation is obtained by selecting polymers which are compatible with each other. Two polymers are said to be compatible when:
 a) the polymers are miscible and it is possible to process them into a two-phase system,
 b) miscibility and copolymerization between the polymers occurs only at the interface between the two phases,
 c) miscibility and copolymerization at the interface prevents the formation of voids between the two phases during operation of primary film formation and subsequent stretching step.

Compatibility between the polymers means that the dispersed phase adheres to the matrix phase. A high electrical breakdown voltage requires good adhesion between the dispersed phase and the matrix phase, as well as no defects. Compatibility between the at least one polymer of the dispersed phase and the at least one polymer of the matrix phase results in a defect-free interface. There is no debonding between the dispersed phase and the matrix phase. The interface can be defined as the boundary between the dispersed phase and the matrix phase. The interface width is typically from about 10 nm to 100 nm.

It is emphasized that because the polymers are compatible there is no need to add a compatibilizer to the mixture phase. It is not necessary to stabilize the interface between the dispersed phase and the matrix phase. The mixture which leads to the film of the invention is thus preferably devoid of any compatibilizer.

In this preferred embodiment where only compatible polymers are present in the mixture, said mixture is devoid of any polymer containing polar groups, i.e. the mixture is devoid of any polymer having a relative permittivity higher than 6.

In one preferred embodiment, the mixture contains polyesters comprising a carboxylic acid ester group R—CO—O—R' wherein R and R' denote any alkyl or aryl group. The mixture also contains polycarbonates comprising a carbonate group R—O—COO—R' wherein R and R' denote any alkyl or aryl or amide or ether or aryl-ether or imides or ester group.

When the at least one polymer constituting the matrix phase is a polyester it can be selected from the group comprising polyethylene terephthalate PET, polyethylene naphthalate PEN, polyethylene isophthalate, polybutylene terephthalate PBT, polybutylene isophthalate, polybutylene naphthalate, polytrimethylene terephthalate PTT, polytrimethylene isophthalate, polytrimethylene naphthalate, poly(cyclohexane-dimethanol-terephthalate PCT, polymethylene 1,3-propylene terephthalate, polyhexamethylene terephthalate, polyisosorbide terephthalate PEIT, polyhexamethylene naphthalate, polyarylates (Par), copolymers thereof and mixtures thereof and liquid crystalline polyesters.

When the at least one polymer constituting the matrix phase is a polycarbonate it can be selected from the group comprising polypropylene carbonate PPC, polyphthalate carbonate, diphenyl polycarbonate DPC, polyethylene terephthalate carbonate, polyethylene carbonate, copolymers thereof and mixtures thereof.

When the at least one polymer in the dispersed phase is a polyester it can be selected from the group of comprising polyethylene terephthalate PET, polyethylene naphthalate PEN, polyethylene isophthalate, polybutylene terephthalate PBT, polybutylene isophthalate, polybutylene naphthalate, polytrimethylene terephthalate PTT, polytrimethylene isophthalate, polytrimethylene naphthalate, polycyclohexane-dimethanol-terephthalate PCT, polymethylene 1,3-propylene terephthalate, polyhexamethylene terephthalate, polyisosorbide terephthalate (PEIT), polyhexamethylene naphthalate, polyarylates (Par), copolymers thereof and mixtures thereof, liquid crystalline polyesters.

When the at least one polymer in the dispersed phase is a polycarbonate it can be selected from the group comprising polypropylene carbonate PPC, polyphthalate carbonate, diphenyl polycarbonate DPC, polyethylene terephthalate carbonate, polyethylene carbonate, copolymers thereof and mixtures thereof.

Suitable types of polycarbonates can be selected from commercial brands such as MAKROLON® from Bayer, LEXAN® from General Electric and PANLITE® from Teijin and XANTAR® from DSM and IUPILON® from Mitsubishi and CALIBER® from Dow. Suitable types of polycarbonates mixtures can be selected from commercial blends such as MAKROBLEND® from Bayer, XENOY® from General Electric, VANDAR® from Ticona and SABRE® from Dow and STAPRON® E from DSM and ULTRABLEND® from BASF. The present list is indicative and not exhaustive.

Suitable types of polyesters can be selected from commercial brands such as TRISTAN®, EASTMAN®, EKTAR®, EASTAR®, KODAR® from Eastman and SKYGREEN® from SK Chemicals. Suitable types of liquid crystalline polyesters can be selected from commercial brands such as VECTRA® from Ticona, Xydar® from Solvay or ZENITE® from DuPont. The present list is indicative and not exhaustive.

In one less preferred embodiment, the mixture contains incompatible polymers and a compatibilizer is added to the mixture to prevent the formation of voids between the two phases during operation of primary film formation and subsequent stretching step.

In one embodiment, the mixture comprises polycarbonate as a dispersed phase in a matrix comprising polyethylene naphthalate and/or polyethylene terephthalate. In one preferred embodiment, the mixture comprises 5-15% polycarbonate PC as a dispersed phase and 85-95% of polyethylene naphthalate PEN as a matrix. In another preferred embodiment, the mixture comprises 25-35% polycarbonate PC as a dispersed phase and 65-75% of polyethylene naphthalate PEN and/or polyethylene terephthalate PET as a matrix. In another preferred embodiment, the mixture comprises 35-45% polycarbonate PC as a dispersed phase and 55-65% of polyethylene naphthalate PEN as a matrix.

In one embodiment, the mixture comprises polycyclohexane-dimethanol-terephthalate PCT or a polycyclohexane-dimethanol-terephthalate PCT copolymer as a dispersed phase in a matrix comprising polyethylene naphthalate PEN and/or polyethylene terephthalate PET. In one preferred embodiment, the mixture comprises 35-45% polycyclohexane-dimethanol-terephthalate PCT as a dispersed phase and 55-65% of polyethylene naphthalate PEN and/or polyethylene terephthalate PET as a matrix.

In one embodiment, the mixture comprises polycarbonate and polycyclohexane-dimethanol-terephthalate PCT or a polycyclohexane-dimethanol-terephthalate PCT copolymer as a dispersed phase in a matrix comprising polyethylene naphthalate PEN and/or polyethylene terephthalate PET.

In one embodiment, the mixture comprises polycarbonate PC and/or polybutylene terephthalate PBT and/or polyethylene terephthalate PET and copolymers thereof as a dispersed phase in a matrix comprising polyethylene naphthalate PEN and/or polyethylene terephthalate PET and/or polycarbonate PC and copolymers thereof.

In one preferred embodiment, the mixture comprises as a dispersed phase 15-45% of a blend comprising either:
a) polyethylene terephthalate PET and polycarbonate PC, or
b) polybutylene terephthalate PBT and polycarbonate PC
and as a matrix 55-85% of polyethylene terephthalate PET. The given percentages are weight percentages by weight of the mixture.

In one embodiment, the mixture comprises polycarbonate PC and polybutylene terephthalate PBT and copolymers thereof as a dispersed phase in a matrix comprising polyethylene naphthalate PEN and/or polyethylene terephthalate PET and/or polycarbonate PC and copolymers thereof.

In one embodiment, the mixture comprises polycarbonate PC and polyethylene terephthalate PET and copolymers thereof as a dispersed phase in a matrix comprising polyethylene naphthalate PEN and/or polyethylene terephthalate PET and/or polycarbonate PC and copolymers thereof.

In one embodiment, the mixture comprises polyethylene terephthalate PET and polybutylene terephthalate PBT and copolymers thereof as a dispersed phase in a matrix comprising polyethylene naphthalate PEN and/or polyethylene terephthalate PET and/or polycarbonate PC and copolymers thereof.

In one embodiment, the mixture comprises polyethylene terephthalate PET as a dispersed phase in a matrix comprising polycyclohexane-dimethanol-terephthalate PCT. In one preferred embodiment, the mixture comprises 35-45% polyethylene terephthalate PET as a dispersed phase and 55-65% of polycyclohexane-dimethanol-terephthalate PCT as a matrix.

In one embodiment, the mixture comprises polyethylene naphthalate PEN and/or polycyclohexane-dimethanol-terephthalate PCT or a polycyclohexane-dimethanol-terephthalate PCT copolymer and/or polytrimethylene terephthalate PTT and/or polytrimethylene isophthalate and/or polyethylene terephthalate PET or a polyethylene terephthalate PET copolymer and/or polybutylene terephthalate PBT or a polybutylene terephthalate copolymer as a dispersed phase in a matrix comprising polycarbonate PC and/or a polycarbonate PC copolymer and/or polyethylene carbonate.

In one embodiment, the mixture comprises polycyclohexane-dimethanol-terephthalate PCT or a polycyclohexane-dimethanol-terephthalate PCT copolymer and/or polybutylene terephthalate PBT or a polybutylene terephthalate copolymer and/or polytrimethylene terephthalate PTT or a polytrimethylene terephthalate copolymer as a dispersed phase in a matrix comprising polycarbonate PC or polyethylene naphthalate PEN or polyethylene terephthalate PET.

In one embodiment, the mixture comprises polybutylene terephthalate PBT as a dispersed phase in a matrix comprising polyethylene terephthalate PET or polycarbonate PC or polyethylene naphthalate PEN or polycyclohexane-dimethanol-terephthalate PCT or a polycyclohexane-dimethanol-terephthalate PCT copolymer.

In one embodiment, the mixture can be composed of commercially available blends such as MAKROBLEND® from Bayer, XENOY® from General Electric, VANDAR® from Ticona and SABRE® from Dow and STAPRON® E from DSM and ULTRABLEND® from BASF. The present list is indicative and not exhaustive.

In one embodiment, the mixture can be composed of commercially available blends such as TRISTAN®, EASTMAN®, EKTAR®, EASTAR®, KODAR® from Eastman and SKYGREEN® from SK Chemicals. The present list is indicative and not exhaustive.

A mixture comprising a polyethylene terephthalate/polyethylene naphthalate copolymer dispersed in a matrix comprising polycarbonate PC or polyethylene naphthalate PEN or polyethylene terephthalate PET can also be considered.

In one preferred embodiment, the mixture comprises 15 to 45% polycarbonate PC as a dispersed phase in a matrix comprising 85 to 55% polyethylene naphthalate PEN.

In one preferred embodiment, the mixture comprises:

for the dispersed phase: at least two polymers selected from the group consisting of polyesters and polycarbonates;

for the matrix: a polyester selected from the group consisting of polyethylene terephthalate (PET) and polyethylene naphthalate (PEN);

wherein the glass transition temperature of each of the polymers in the dispersion is in the range of Tgm+10° C. to Tgm+40° C., wherein Tgm is the glass transition temperature of the polyester in the matrix. The glass transition temperature for PET is about 75° C. The glass transition temperature for PEN is about 125° C. A mixture comprising polyethylene terephthalate (PET) as a matrix is particularly preferred.

It is advantageous that the dispersed phase comprises polymers having a glass transition temperature in the range of Tgm+10° C. to Tgm+40° C., wherein Tgm is the glass transition temperature of the polyester in the matrix. This feature provides the following advantage: the platelets in the stretched film exhibit an elliptic form which acts as brakes slowing down the electrons motion and so reduce their kinetic energy. A very good miscibility is in particular obtained when the dispersed phase comprises a mixture of a polycarbonate and a polyester; and the polyester in the matrix is polyethylene terephthalate (PET) or a polybutylene terephthalate (PBT). The preferred polyester in the dispersed phase is polyethylene terephthalate (PET).

In one embodiment, the mixture is composed of commercially available blends such as MAKROBLEND® from Bayer, XENOY® from General Electric, VANDAR® from Ticona and SABRE® from Dow and STAPRON® E from DSM and ULTRABLEND® from BASF. The present list is indicative and not exhaustive.

As a result of the good miscibility and the elliptic form of the platelets, a high breakdown voltage is obtained.

In a preferred embodiment, the mixture comprises a dispersed phase consisting of polycyclohexane-dimethanol-terephthalate (PCT) polymer or copolymer and the matrix consists of polyethylene terephthalate (PET).

The mixture may also contain inorganic filler particles to improve the handling and winding of the resulting film. Preferably the mixture contains inorganic filler particles. Preferably the mixture contains filler particles in an amount up to 60000 parts per million (ppm). In one preferred embodiment, the stretched film contains up to 10000 parts per million of filler particles.

The inorganic filler particles may be without limitation calcium carbonate, clays, silica, zeolites, silicone beads (functionalized polydimethyl siloxanes), dicalcium phosphates (DPC), tricalcium phosphates (TPC), cenospheres, zeeospheres, talc, titanium dioxides, barium sulfate and barium titanate. Filler particle size distributions can be monomodal, bimodal and trimodal. Preferably the mean particle diameter is comprised between 0.1 and 10 micrometers for a monomodal, bimodal and trimodal distribution.

The different constituents of the mixture are mixed and the mixture is heated and stirred such as to enable the formation of a dispersed phase in the polymer matrix as explained hereafter. In the most preferred embodiment of the invention, the polymer mixture is a dispersion of at least one first polyester and/or polycarbonate in a matrix of at least one second polyester and/or polycarbonate different from the first polyester and/or polycarbonate.

It is important that the at least one polymer of the dispersed phase copolymerizes with the at least one different polymer of the matrix phase only at the interface between the matrix phase and the dispersed phase. The process conditions must be selected such as to achieve a blend of compatible polymers. In the preferred embodiment, wherein the polymer mixture comprises at least one polyester and/or polycarbonate dispersed in a matrix of at least one different polyester and/or polycarbonate, it is emphasized that the film is not obtained through process conditions which lead to copolymerization of the polyesters or polycarbonates. Therefore, the process conditions such as temperature and mixing time are to be selected such as to minimize the degree of copolymerization either between polyesters, or between polycarbonates or between a polyester and a carbonate. It is possible to achieve the following structures:

a dispersed phase of at least one polyester in a matrix of at least one different polyester, or a dispersed phase of at least one polycarbonate in a matrix of at least one different polycarbonate, or a dispersed phase of at least one polyester in a matrix of at least one polycarbonate, or a dispersed phase of at least one polycarbonate in a matrix of at least one polyester.

Compatibility between two polyesters is obtained by miscibility and ester-ester exchange at the interface between the polyesters.

Compatibility between two polycarbonates is obtained by miscibility and carbonate-carbonate exchange at the interface between the polycarbonates.

Compatibility between a polyester and a polycarbonate is obtained by miscibility and ester-carbonate exchange at the interface between the polyester and a polycarbonate.

Compatibility between the dispersed phase and the matrix phase allows biaxial stretching especially at high loads of platelets.

The occurrence of a copolymerization reaction may be detected through Differential Scanning calorimetry (DSC) measurements.

The mixture initially contains at least two distinct polymers, which are each characterized by a glass transition temperature. The presence of the at least two distinct polymers in the mixture can be confirmed through DSC measurements. Indeed, the DSC technique detects as many distinct glass transition temperatures as the number of distinct polymers present in the mixture.

During the mixing and heating step the amount of each polymer in the mixture tends to decrease because of the occurrence of a copolymerization reaction between the polymers. If a copolymerization reaction occurs between the polymers then the distinct glass transition temperatures disappear and a unique glass transition occurs describing the formation of the copolymer. So assuming that copolymerization is completed, then the mixture contains only one copolymer and the DSC measurements indicate only one glass transition temperature peak corresponding to the copolymer formed.

In order to avoid copolymerization between the polyesters it is desirable to set a short mixing time. The mixing time is typically from about 5 minutes to about 40 minutes.

As an example of suitable temperature conditions, the mixture may be heated at a temperature T that is at least 5° C. greater than the highest melting point of each polymer composing the mixture for a time such that the mixture still exhibits separate transition temperatures.

The temperature and the mixing time are preferably selected such that the mixture still exhibits separate glass transition temperatures. In the preferred embodiment, wherein the at least two distinct polymers are chosen from the group comprising polyesters and polycarbonates, these process conditions lead to a blend of polyesters and/or polycarbonates and not to a copolyester.

Melt viscosities of polymers composing the blends are preferably in a range of 50 Pa·sec to 5000 Pa·sec at a temperature Tm which is the highest melting temperature of the polymers in the mixture.

The polymer mixture is then extruded through an extruder and a melt system. A primary film is formed through a slit die and cooled down on a quenching drum.

The primary film is then processed into a film. The stretching step causes the dispersed phase to change shape. The shape of the polyester nodules or islands changes from an initially substantially round shape to an elliptic shape also called platelet-like shape. The term platelet denotes a body having a substantially elliptic shape and which is characterized by a specific dimension ratio. This dimension ratio is the ratio of the platelets largest dimension to the platelets smallest dimension. It is at least 2, preferably at least 3, and most preferably at least 10. The smallest and largest dimensions are determined through electron microscopy by first cutting the film through its section, not through its plane, and then analyzing the picture of the resulting section. Preferably, the largest dimension of the platelets is less than 10 microns, preferably less than 5 microns, more preferably less than 1 micron.

Figure 3:
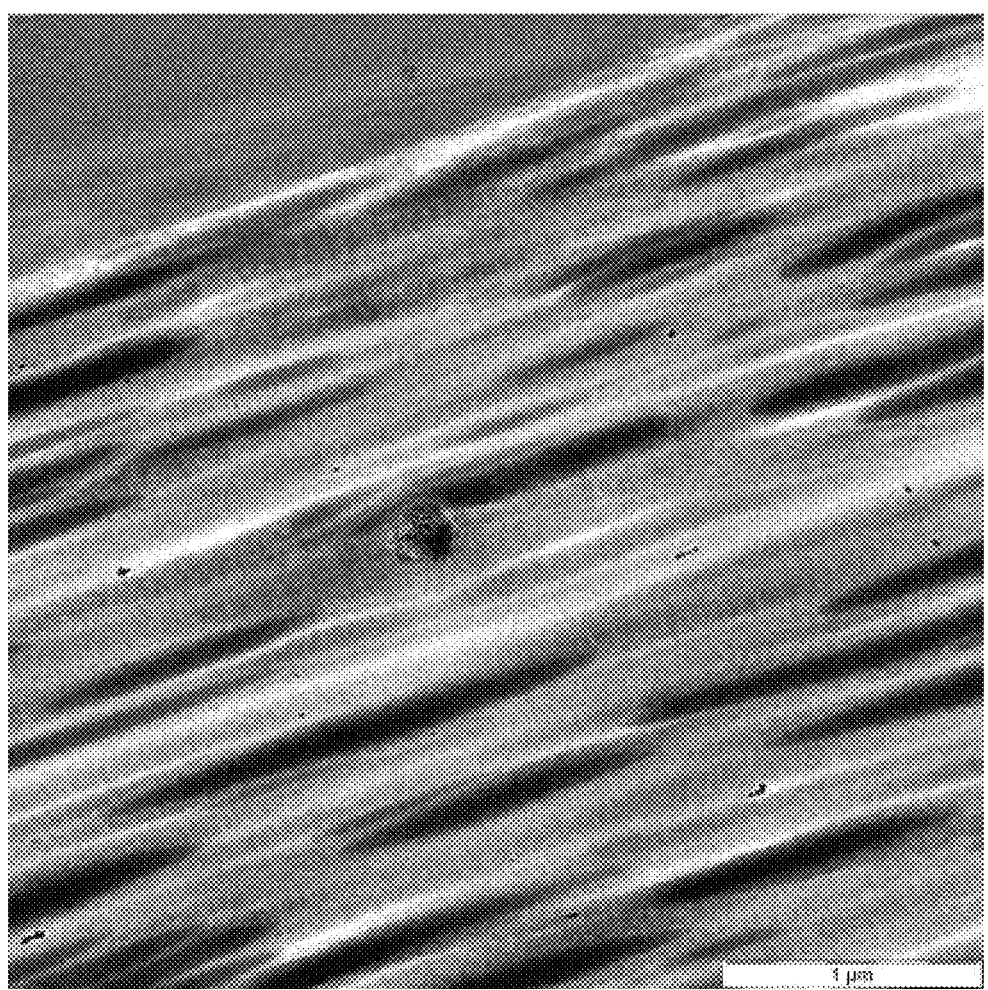
FIG. 3 represents an electron microscopy photography of a stretched film 3.5×3.5 comprising 30% of polycarbonate PC as a dispersed phase in a polyethylene naphthalate PEN matrix. No voids are observed at the interface between the dispersed phase and the matrix in the stretched film. The magnification rate is 5000.
Figure 4:
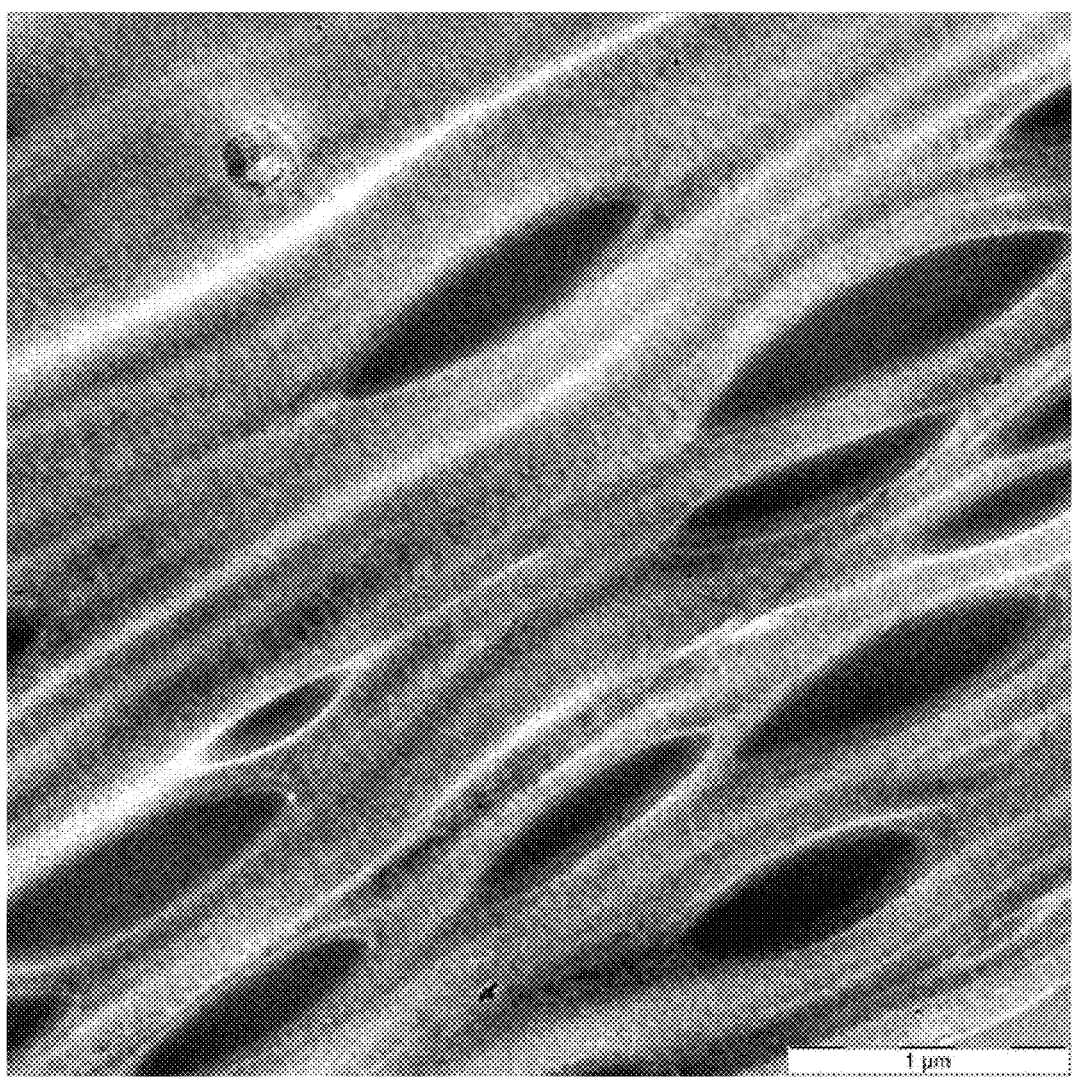
FIG. 4 represents an electron microscopy photography of a stretched film 3.5×3.5 comprising 20% polycarbonate PC as a dispersed phase in a matrix composed of PEN and PET. No voids are observed at the interface between the dispersed phase and the matrix in the stretched film. The magnification rate is 5000.

FIG. 3 represents an electron microscopy photography of a stretched film comprising PC as a dispersed phase in a PEN matrix. FIG. 4 represents an electron microscopy photography of a stretched film comprising 20% polycarbonate PC as a dispersed phase in a matrix composed of PEN and PET. No voids are observed in both FIG. 3 and FIG. 4 at the interface between the dispersed phase and the matrix in the stretched film.

Figure 5:
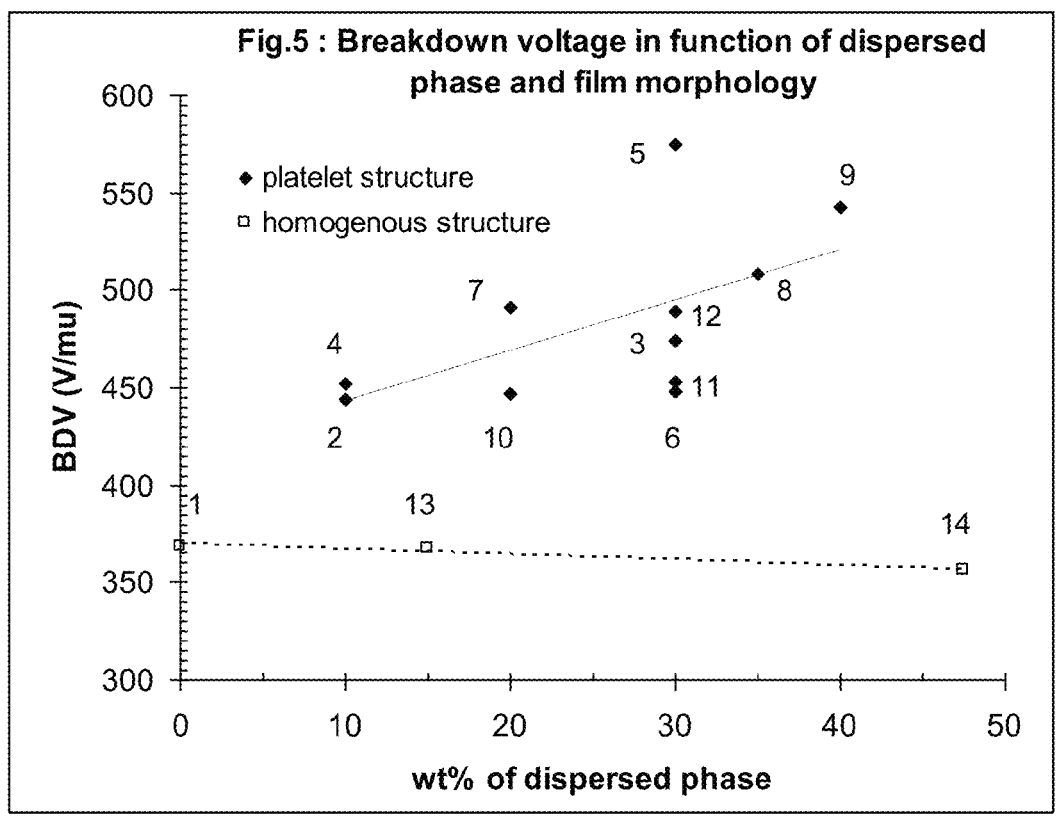
FIG. 5 represents the breakdown voltage (expressed in V/µm) as a function of the weight percentage of the dispersed phase for the different films presented in the experimental section. The label on the data points shown in FIG. 5 indicates the number of the example.

FIG. 5 represents the breakdown voltage (expressed in V/μm) as a function of the weight percentage of the dispersed phase in the polymer mixture. Increasing the weight percentage of the dispersed phase increases the breakdown voltage. The fact that electrons are forced to move around the platelet is responsible for the high breakdown voltage of the stretched film. It can also be seen from FIG. 5 that high breakdown voltage values, i.e. higher than 400 V/micron, can be obtained. The invention is thus based on the finding that the presence of platelets imparts a higher dielectric breakdown voltage to the film, which results in a film having a higher energy density. FIG. 5 shows that the higher the percentage of platelets in the matrix the higher the breakdown voltage. On the contrary, FIG. 5 shows on Example 14 that a film prepared from a mixture of polymers which have copolymerized has a homogenous structure. This film shows a low break-down voltage.

The platelet-like shape of the dispersed phase forms a barrier to the electrons and the presence of a platelet-like dispersed polymer phase prevents the electrons from crossing the width of the plastic film. The presence of the platelets also imparts a slower motion to the electrons. Platelets thus act as brakes slowing down the electrons motion and so reduce their kinetic energy. The electrons are forced to move around the platelets by repulsion forces created by the charges located at the interface of the dispersed platelets. The travel length of the electrons increases when the percentage of platelets increases as indicated in FIG. 5. Further, the higher the ratio of the platelets largest dimensions to the platelets smallest dimension the higher the breakdown voltage. The present invention is based on the discovery that the breakdown voltage of a plastic film can be increased by slowing down the electron motion across the film through the presence of platelets in the film. The presence of platelets creates a tortuosity which increases the travel length of the electrons. Tortuosity can be defined as the ratio of the travel length of the electrons to the width of the plastic film.

In a preferred embodiment the morphology leading to a higher break-down voltage can be achieved with a mixture of compatible polymers such as polyesters and/or polycarbonates. The skilled person in the art can produce a similar morphology with a mixture of incompatible polymers by addition of compatibilizers.

The shape of the platelets can be varied according to the glass transition temperature of the polymer constituting the dispersed phase.

The film is preferably bi-axially stretched. The primary film called cast film may be bi-axially stretched in both directions transverse direction (TD) and machine direction (MD) by the mean of a sequential or simultaneous process.

According to a preferred embodiment, the stretching ratio in each direction is in the range of 2 to 5 times, preferably from 3 to 4.5 times.

When a simultaneous process is carried out, the film is stretched at a temperature in the range of Tg+5° C. to Tg+30° C. where Tg corresponds to the highest glass transition temperature of the polymers constituting the mixture. The obtained thickness is typically in the range of 0.5-20 μm, preferably from 1.4 to 5 μm. The stretching temperature can be adapted in the case of a sequential stretch by the person skilled in the art.

The film then undergoes a heat treatment, which imparts dimensional stability to the film. The film is heated at a high temperature in the range of Tm−80° C. to Tm−10° C., preferably in the range of Tm−70° C. to Tm−20° C., where Tm is the highest melting temperature of the polymers in the mixture.

The film of the invention has a high service temperature. It can be used between 100° C. and 130° C. It thus finds use in high temperature and high-energy storage applications like capacitor films in hybrid cars.

The film of the invention can advantageously be used as a barrier to oxygen.

The film of the invention can advantageously be used as an electrical insulator film.

The following examples are illustrative of the invention and should not be considered as limiting.

EXAMPLES

The following examples are illustrative of the invention and should not be considered as limitative.

The properties measured on the film samples indicated shown in table I are the following:

The thickness is measured by use of a digital point thickness gage commercially available from Mahr Feinprüf (Militron) or Heidenhain. The thickness of a 5 cm×5 cm square film is determined by the average of 5 measuring points in the film square. The thickness of the samples is given in microns in Table I.

Breakdown voltage expressed in V per μm. The breakdown voltage was measured on a 25 cm²-surface (5 cm×5 cm) on a film sample by use of an aluminium foil and an electrode. A voltage ramp is applied to the film by a commercially available power source (UN Gerätebau). The breakdown voltage of the film is the maximum voltage measured when a current superior to 5 mA flows through the film sample. The breakdown voltage per thickness unit is the maximum measured voltage divided by the film thickness. An average of 5 measurements of breakdown voltage (expressed in V/μm) is given in Table I.

Melting point expressed in ° C. as measured by differential scanning calorimetry by mean of a commercially available instrument from TA Instrument (model TA DSC 2920). The melting point temperature is measured in a first heating scan. Temperature scan rate is 20° C. per minute.

Glass transition point expressed in ° C. as measured by differential scanning calorimetry by mean of a commercially available instrument from TA Instrument (model TA DSC 2920). The glass transition temperature is measured in a second heating cycle after quenching. Temperature scan rate is 20° C. per minute.

Mechanical modulus measured according to ASTM D-882-80 representing the stress at 1% elongation.

Dimensional stability measured by the thermal shrinkage of film sample subject to a temperature of 150 and 200° C. during 30 minutes. The sample was a square piece of a film having a length of 0.5 inch. The shrinkage is defined by the following formula:

((initial length−length after shrinkage)/initial length)× 100

Energy density expressed in J/cm³ indicating the energy the dielectric film sample can store per volume unit. Energy density is calculated by following equation:

Energy density $E=0.5 \cdot \in \cdot \in_0 \cdot BDV^2$, where BDV is breakdown voltage (in V/μm),
$\in$ is the theoretical relative permittivity of blends based on their composition.

Theoretical permittivity is calculated by use of formula:

$1/\in = \Sigma_i w_i/\in_i$ where $\in$ is the relative permittivity of the film,
$w_i$ is the weight percentage of the $i^{th}$ component of the film.
$\in_i$ is the relative permittivity of the $i^{th}$ component the dispersed phase at a temperature of 25° C. and a frequency of 1 kHz.
$\in_0$ is the absolute permittivity.

The breakdown voltage was first measured and the energy density was calculated from the measured breakdown voltage.

All the following examples contain fillers particles having a size in the range of 2-10 microns.

Comparative Example 1

A polyethylene naphthalate PEN polymer of an intrinsic viscosity of 0.63 dl/g measured in 50% dichloroethane (DCE)/trifluoroacetic acid solution is extruded in a twin-screw extruder. A cast film is obtained by forming the polymer in a slot die system and by cooling on quench drum. The cast film is subject to biaxial simultaneous stretching in laboratory stretcher (commercially available from companies Brueckner or T.M Long or Inventure laboratory). In this technology, the film is gripped by clips, which are simultaneously or sequentially moving in the machine or transverse direction. The stretching is performed in a range of temperature between 145 and 155° C. at a stretching ratio of 3.5 by 3.5.

The biaxially film obtained is between 6 and 15 μm thick. Table I indicates the typical properties of the films.

Example 2

A polyethylene naphthalate PEN of an intrinsic viscosity of 0.63 dl/g measured in 50% dichloroethane (DCE)/trifluoroacetic acid solution is mixed with polycarbonate PC Makrolon® 2408 in an twin screw extruder in respective amounts of 90% wt./10% wt. based on the total weight of the polymeric mixture.

Stretching is similar to that in example 1, except that the stretching temperature is in the range of 150 to 170° C. and the stretching ratio is in range of 3.5 to 4×.

The biaxially stretched film obtained is between 6 and 15 μm thick and has typical properties as indicated in table I.

Example 3

A polyethylene naphthalate PEN of an intrinsic viscosity of 0.63 dl/g measured in 50% dichloroethane (DCE)/trifluoroacetic acid solution is mixed with polycarbonate PC Makrolon® 2408 in an twin screw extruder in respective amounts of 70% wt./30% wt. based on the total weight of the polymeric mixture. Stretching is similar to that in example 2.

The biaxially stretched film obtained is between 6 and 15 μm thick and has typical properties as indicated in table I.

Example 4

A polyethylene naphthalate PEN of an intrinsic viscosity of 0.63 dl/g measured in 50% dichloroethane (DCE)/trifluoroacetic acid solution is mixed with polycarbonate PC Makrolon® 3108 in an twin screw extruder in respective amounts of 90% wt./10% wt. based on the total weight of the polymeric mixture. Stretching is similar to that in example 2.

The biaxially stretched film obtained is between 6 and 15 μm thick and has typical properties as indicated in table I.

Example 5

A polyethylene naphthalate PEN of an intrinsic viscosity of 0.63 dl/g measured in 50% dichloroethane (DCE)/trifluoroacetic acid solution is mixed with polycarbonate PC Makrolon® 3108 in an twin screw extruder in respective amounts of 70% wt./30% wt. based on the total weight of the polymeric mixture. Stretching is similar to that in example 2.

The biaxially stretched film obtained is between 6 and 15 μm thick and has typical properties as indicated in table I.

Example 6

A polyethylene naphthalate PEN of an intrinsic viscosity of 0.63 dl/g measured in 50% dichloroethane (DCE)/trifluoroacetic acid solution is mixed with polycarbonate PC Makrolon® 3108 and a polycarbonate PC® 2408 in an twin screw extruder in respective amounts of 70% wt./15% wt/15% wt. based on the total weight of the polymeric mixture. Stretching is similar to that in example 2.

The biaxially stretched film obtained is between 6 and 15 μm thick and has typical properties as indicated in table I.

Example 7

A polyethylene naphthalate PEN of an intrinsic viscosity of 0.63 dl/g measured in 50% dichloroethane (DCE)/trifluoroacetic acid solution is mixed with polycarbonate PC Makrolon® 2408 and a polyethylene terephthalate PET in an twin screw extruder in respective amounts of 70% wt./20% wt./10% wt. based on the total weight of the polymeric mixture. Stretching is similar to that in example 2, except that stretching temperatures are in the range of 150 to 160° C.

The biaxially stretched film obtained is between 6 and 15 μm thick and has typical properties as indicated in table I.

Example 8

A polyethylene naphthalate PEN of an intrinsic viscosity of 0.63 dl/g measured in 50% dichloroethane (DCE)/trifluoroacetic acid solution is mixed with polycarbonate PC Makrolon® 3108 in an twin screw extruder in respective amounts of 65% wt./35% wt. based on the total weight of the polymeric mixture. Stretching is similar to that in example 2, except that stretching temperatures are in the range of 150 to 160° C.

The biaxially stretched film obtained is between 6 and 15 µm thick and has typical properties as indicated in table I.

Example 9

A polyethylene naphthalate PEN of an intrinsic viscosity of 0.63 dl/g measured in 50% dichloroethane (DCE)/trifluoroacetic acid solution is mixed with polycarbonate PC Makrolon® 3108 in an twin screw extruder in respective amounts of 60% wt./40% wt. based on the total weight of the polymeric mixture. Stretching is similar to that in example 2, except that stretching temperatures are in the range of 150 to 160° C.

The biaxially stretched film obtained is between 6 and 15 µm thick and has typical properties as indicated in table I.

Example 10

A polyethylene naphthalate PEN of an intrinsic viscosity of 0.63 dl/g measured in 50% dichloroethane (DCE)/trifluoroacetic acid solution is mixed with polycarbonate PC Makrolon® 3108 in an twin screw extruder in respective amounts of 80% wt./20% wt. based on the total weight of the polymeric mixture. Stretching is similar to that in example 2, except that stretching temperatures are in the range of 150 to 160° C.

The biaxially stretched film obtained is between 6 and 15 µm thick and has typical properties as indicated in table I.

Example 11

A polyethylene terephthalate PET of an intrinsic viscosity of 0.59 dl/g measured in 40% tri-chloro-ethane (TCE)/phenol solution is mixed with an amorphous blend with an single glass transition of 100.8° C. composed of a polycarbonate PC and a polyester in an twin screw extruder in respective amounts of 70% wt./30% wt. based on the total weight of the polymeric mixture. Stretching is similar to that in example 2, except that stretching temperatures are in the range of 105 to 115° C.

The biaxially stretched film obtained is between 6 and 15 µm thick and has typical properties as indicated in table I.

Example 12

A polyethylene terephthalate PET of an intrinsic viscosity of 0.56 dl/g measured in 40% tri-chloro-ethane (TCE)/phenol solution is mixed with an polycyclohexane-dimethanol-terephthalate PCT copolymer Eastman A150 ® in an twin screw extruder in respective amounts of 70% wt./30% wt. based on the total weight of the polymeric mixture. Stretching is similar to that in example 2, except that stretching temperatures are in the range of 95 to 105° C.

The biaxially stretched film obtained is between 6 and 15 µm thick and has typical properties as indicated in table I.

Both films of Examples 11 and 12 have shown to be particularly well suited for making power capacitors. Known power capacitors generally contain a dielectric film made of polypropylene (PP). This type of capacitors cannot be operated at a temperature higher than 105° C. A capacitor comprising the film of Example 11 or Example 12 according to the invention can be operated at a temperature in the range of 105° C. to 125° C. It is thus more stable at high temperature than a capacitor comprising a PP dielectric film. A capacitor comprising the film of Example 11 or Example 12 can thus be used for replacing power capacitors comprising PP films.

Comparative Example 13

A polyethylene naphthalate PEN of an intrinsic viscosity of 0.63 dl/g measured in 50% dichloroethane (DCE)/trifluoroacetic acid solution is mixed with a polyethylene terephthalate PET of an intrinsic viscosity of 0.55 dl/g measured in 40% tri-chloro-ethane (TCE)/phenol solution in an twin screw extruder in respective amounts of 85% wt./15% wt. based on the total weight of the polymeric mixture.

Stretching is similar to that in example 2, except that stretching temperatures are in the range of 140 to 150° C.

The biaxially stretched film obtained is between 4 and 6 µm thick and has typical properties as indicated in table I.

The film of Comparative Example 13 comprises a single phase.

Comparative Example 14

A polymer mixture composed of 47.5% wt. of polybutylene terephthalate (PBT) and 52.5% wt. of an isophthalate copolyester is mixed in a twin screw extruder. The mixture is processed to achieve a copolymerization both in the melt system and in the extruder. The cast film is subject to stretching. The typical stretching temperature is in the range of 70 to 100° C. The cast film and the stretched film show a homogeneous structure. The break-down voltage of a 4 micron thick film consisting of the above composition shows a break-down voltage of 356 V/micron and an energy density of 1.85 J/cm$^3$. This comparative example clearly shows that a single copolyester shows a low breakdown voltage and a low energy density.

In contrast, examples 2-12 which are according to the invention and which exhibit a phase dispersed in a matrix exhibit improved electrical properties.

Table I hereafter summarizes the typical properties of the stretched film prepared according to the above examples.

TABLE I

| Example | relative Permittivity | thickness (mu) | BDV (V/mu) | Energy density (J/cm3) | Tg 1 (deg C.) | Tg 2 (deg C.) | melting point (deg C.) | Modulus (N/mm2) | Shrinkage 150 deg C. (%) | | | Shrinkage 200 deg C. (%) | | |
|---|---|---|---|---|---|---|---|---|---|---|---|---|---|---|
| | | | | | | | | | MD | TD | avg. | MD | TD | avg. |
| 1 | 3.05 | 6.4 | 368 | 1.83 | 118.5 | — | 265.8 | 5450 | 1.2 | 1.6 | 1.4 | 3.6 | 4 | 3.8 |
| 2 | 3.03 | 5.0 | 444 | 2.65 | 118.7 | 138.7 | 265.6 | 5281 | 1 | 1 | 1 | 4 | 4.4 | 4.2 |
| 3 | 3.00 | 7.6 | 474 | 2.99 | 118.7 | 137.5 | 266.5 | 4642 | 1.2 | 1.8 | 1.5 | 6 | 7 | 6.5 |
| 4 | 3.03 | 6.7 | 453 | 2.75 | 117.1 | 139.4 | 267.3 | 5000 | 0.4 | 1 | 0.7 | 3.4 | 5 | 4.2 |

TABLE I-continued

| Example | relative Permittivity | thickness (mu) | BDV (V/mu) | Energy density (J/cm3) | Tg 1 (deg C.) | Tg 2 (deg C.) | melting point (deg C.) | Modulus (N/mm2) | Shrinkage 150 deg C. (%) MD | TD | avg. | Shrinkage 200 deg C. (%) MD | TD | avg. |
|---|---|---|---|---|---|---|---|---|---|---|---|---|---|---|
| 5 | 3.00 | 5.8 | 575 | 4.39 | 119.9 | 141.8 | 267.1 | 4609 | 1.4 | 1.8 | 1.6 | 7.2 | 7.4 | 7.3 |
| 6 | 3.00 | 8.2 | 453 | 2.73 | 119.7 | 140.3 | 266.6 | 4684 | 1.6 | 2 | 1.8 | 7.6 | 8 | 7.8 |
| 7 | 3.04 | 8.1 | 455 | 2.78 | 109.5 | 138.3 | 259.5 | 4089 | 0.8 | 0.4 | 0.6 | 2 | 1.4 | 1.7 |
| 8 | 3.00 | 5.2 | 508 | 3.42 | 115.5 | 133.5 | 264.2 | 3313 | 0.8 | 0.8 | 0.8 | 2.2 | 2.4 | 2.3 |
| 9 | 2.99 | 6.5 | 543 | 3.90 | 116.9 | 132.9 | 265 | 3433 | 0.6 | 1 | 0.8 | 3.2 | 2.8 | 3 |
| 10 | 3.02 | 8.5 | 446 | 2.66 | 118.4 | 139.2 | 263.6 | 4878 | 1.4 | 1.5 | 1.5 | 5.1 | 6.5 | 5.8 |
| 11 | 3.27 | 6.3 | 448 | 2.90 | 74.7 | 101.1 | 252.3 | 3613 | 2.4 | 2 | 2.2 | 7 | 7 | 7 |
| 12 | 3.24 | 7.0 | 498 | 3.55 | 74.1 | 86.6 | 253.2 | 2820 | 1.6 | 1.6 | 1.6 | 5.6 | 5.2 | 5.4 |
| 13 | 3.09 | 6.0 | 367 | 1.84 | 110.9 | — | 254.2 | 5276 | 1 | 0.7 | 0.9 | 2.8 | 2.5 | 2.7 |
| 14 | | 4 | 356 | 1.85 | | | | | | | | | | |

The films of examples 2-12, all in the thickness range of 4.5 to 8.5 μm, show more than one glass transition temperature and a structure comprising platelets. These films exhibit a break-down voltage of at least 440 V/μm.

In contrast, Comparative Examples 1, 13 and 14 show a homogeneous structure and a single glass transition temperature. The films of comparative examples 1, 13 and 14 exhibit a break-down voltage of only 368, 367 and 356 V/μm, respectively, thus lower than the breakdown voltages of examples 2-12.

The films of examples 2-12 exhibit an energy density of at least 2.6 J/cm$^3$ whereas the films of comparative examples 1, 13 and 14 exhibit an energy density of only 1.83, 1.84 and 1.85 J/cm$^3$ respectively, a typical value for a polyester film.

These examples confirm that the film of the invention can withstand a higher breakdown voltage and has a higher energy density.

The invention claimed is:

1. A capacitor comprising a dielectric film which is a stretched film comprising a dispersion of at least one polyester and/or polycarbonate in a matrix of at least one polyester and/or polycarbonate different from the first polyester and/or polycarbonate, the percentage by weight of the dispersed polyester and/or polycarbonate in the dispersion being less than 50% and the dispersed polyester and/or polycarbonate being in the form of platelets, wherein the stretched film has an electrical breakdown, measured by the mean of 5×5 cm area, greater than 370 V/μm.

2. The capacitor according to claim 1, in which the at least one dispersed polyester is selected from the group consisting of polyethylene terephthalate (PET), polyethylene naphthalate (PEN), polyethylene isophthalate, polybutylene terephthalate (PBT), polybutylene isophtalate, polybutylene naphthalate, polytrimethylene terephthalate (PTT), polytrimethylene isophthalate, polytrimethylene naphthalate, poly(cyclohexylene-dimethanol-terephthalate (PCT), polymethylene 1,3-propylene terephthalate, polyhexamethylene terephthalate, polyisosorbide terephthalate (PEIT), polyhexamethylene naphthalate, polyarylates (Par), copolymers thereof, mixtures thereof, and liquid crystalline polyesters.

3. The capacitor according to claim 1, in which the at least one dispersed polycarbonate is selected from the group consisting of polypropylene carbonate (PPC), polyphthalate carbonate, diphenyl polycarbonate (DPC), polyethylene terephthalate carbonate, polyethylene carbonate, copolymers thereof and mixtures thereof.

4. The capacitor according to claim 1, wherein in said matrix of at least one polyester and/or polycarbonate, the polyester is selected from the group consisting of polyethylene terephthalate (PET), polyethylene naphthalate (PEN), polyethylene isophthalate, polybutylene terephthalate (PBT), polybutylene isophtalate, polybutylene naphthalate, polytrimethylene terephthalate (PTT), polytrimethylene isophthalate, polytrimethylene naphthalate, poly(cyclohexylene-dimethanol-terephthalate (PCT), polymethylene 1,3-propylene terephthalate, polyhexamethylene terephthalate, polyisosorbide terephthalate (PEIT), polyhexamethylene naphthalate, polyarylates (Par), copolymers thereof, mixtures thereof and liquid crystalline polyesters.

5. The capacitor according to claim 1, wherein in said matrix of at least one polyester and/or polycarbonate, the polycarbonate is selected from the group consisting of polypropylene carbonate (PPC), polyphthalate carbonate, diphenyl polycarbonate (DPC), polyethylene terephthalate carbonate, polyethylene carbonate, copolymers thereof and mixtures thereof.

6. The capacitor according to claim 1, in which the stretched film has a thickness in the range of 0.3 to 25 μm.

7. The capacitor according to claim 1, in which the stretched film has a thickness in the range of 0.9 to 6 μm.

8. The capacitor according to claim 1, in which the stretched film has a thickness in the range of 2 to 4 μm.

9. The capacitor according to claim 1, in which the largest dimension of said platelets is less than 10 microns.

10. The capacitor according to claim 1, in which the largest dimension of said platelets is less than 5 microns.

11. The capacitor according to claim 1, in which the largest dimension of said platelets is less than 1 micron.

12. The capacitor according to claim 1, in which the at least one dispersed polyester and/or polycarbonate is selected from polymers having a relative permittivity in the range from 1 to less than 6.

13. The capacitor according to claim 1, in which the stretched film is bi-axially stretched.

14. The capacitor according to claim 1, in which the stretched film has an electrical breakdown, measured by the mean of 5×5 cm area, in the range of 440 to 550 V/μm.

15. The capacitor according to claim 1, in which the stretched film has an energy density higher than 2.0 J/cm$^3$.

16. The capacitor according to claim 1, in which the stretched film has an energy density in the range of 2.5 to 3.5 J/cm$^3$.

17. The capacitor according to claim 1, in which the stretched film has an energy density higher in the range of 3.5 to 4.5 J/cm$^3$.

18. The capacitor according to claim 1, in which the stretched film contains up to 60000 parts per million of filler particles.

19. The capacitor according to claim 1, in which the stretched film is devoid of any filler.

20. The capacitor according to claim 1, in which the stretched film has a mechanical modulus in machine direction (MD) or transverse direction (TD) higher than 1000 N/mm$^2$.

21. The capacitor according to claim 1, in which the stretched film has a mechanical modulus in machine direction (MD) or transverse direction (TD) in the range of 2500 to 4000 N/mm$^2$.

22. The capacitor according to claim 1, in which the stretched film has a shrinkage in both machine direction (MD) and transverse direction (TD) of less than 5% at a temperature of 150° C. and less than 15% at a temperature of 200° C.

23. The capacitor according to claim 1, in which in the stretched film:
the dispersion consists of at least two polymers selected from the group consisting of polyesters and polycarbonates; the dispersion forming platelets each of which being formed by the at least two polymers;
the matrix consists of a polyester selected from the group consisting of polyethylene terephthalate (PET) and polyethylene naphthalate (PEN);
wherein the glass transition temperature of each of the polymers in the dispersion is in the range of Tgm+10° C. to Tgm+40° C., wherein Tgm is the glass transition temperature of the polyester of the matrix.

24. The capacitor according to claim 23, wherein the dispersion is a mixture of a polycarbonate and a polyester and the polyester of the matrix is polyethylene terephthalate (PET).

25. The capacitor according to claim 24, wherein the polyester of the dispersion is polyethylene terephthalate (PET) or polybutylene terephthalate (PBT).

26. The capacitor according to claim 1, wherein the dispersion consists of polycyclohexane-dimethanol-terephthalate PCT copolymer and the polyester of the matrix is polyethylene terephthalate (PET).

27. The capacitor according to claim 1, wherein the dispersion consists of a polycarbonate PC and the polyester of the matrix is polyethylene naphthalate (PEN).

28. The capacitor according to claim 1, in which the at least one dispersed polyester and/or polycarbonate is selected from polymers having a relative permittivity in the range from 1 to 4.

29. The capacitor according to claim 1, in which the at least one dispersed polyester and/or polycarbonate is selected from polymers having a relative permittivity in the range from 2 to 4.

30. The capacitor according to claim 1, in which the at least one dispersed polyester and/or polycarbonate is selected from polymers having a relative permittivity in the range from 2.5 to 3.5.

* * * * *